(12) United States Patent
Lupke et al.

(10) Patent No.: US 6,352,425 B1
(45) Date of Patent: Mar. 5, 2002

(54) ROTATING DISK EXTRUDER

(76) Inventors: Manfred A. A. Lupke, 92 Elgin Street, Thornhill, Ontario (CA), L3T 1W6; Stefan A. Lupke, 32 Vintage Lane, Thornhill, Ontario (CA), L3T 1X6

( * ) Notice: Subject to any disclaimer, the term of this patent is extended or adjusted under 35 U.S.C. 154(b) by 0 days.

(21) Appl. No.: 09/514,380

(22) Filed: Feb. 28, 2000

(51) Int. Cl.$^7$ ............................................. B29C 49/00
(52) U.S. Cl. ............................ 425/381.2; 425/382 R; 425/382.3; 425/463; 264/209.2
(58) Field of Search ......................... 425/381.2, 382 R, 425/382.3, 463, 464, 133.1; 264/209.2

(56) References Cited

U.S. PATENT DOCUMENTS

| | | | | |
|---|---|---|---|---|
| 3,609,807 A | * | 10/1971 | Neuville et al. | 425/204 |
| 3,611,490 A | * | 10/1971 | Neuville et al. | 425/381 |
| 3,689,189 A | * | 9/1972 | Wagner | 425/376 |
| 3,784,339 A | * | 1/1974 | Springfield | 425/133 |
| 3,832,116 A | * | 8/1974 | Delorme | 425/381.2 |

FOREIGN PATENT DOCUMENTS

| | | | | |
|---|---|---|---|---|
| GB | 2202783 A | * | 10/1998 | |
| JP | 02043008 A | * | 2/1990 | |
| JP | 03153311 A | * | 7/1991 | |
| WO | WO-97/01428 A1 | * | 1/1997 | B29C/47/02 |

* cited by examiner

*Primary Examiner*—Nam Nguyen
*Assistant Examiner*—Joseph S Del Sole

(57) ABSTRACT

An extruder for use in a plastic extrusion process comprises a plurality of extruder members. Each extruder member comprises a plate portion and a hollow tubular portion perpendicular to the plate portion. The plate portions of the extruder members are located side by side with one another and define a first plastic handling part of the extruder in which there is firstly a feeding and then a transition of plastic material fed to the extruder. The tubular portions of the extruder members which are telescopically interfitted with one another define a second plastic handling part of the extruder for metering of plastic flow output from the extruder.

5 Claims, 5 Drawing Sheets

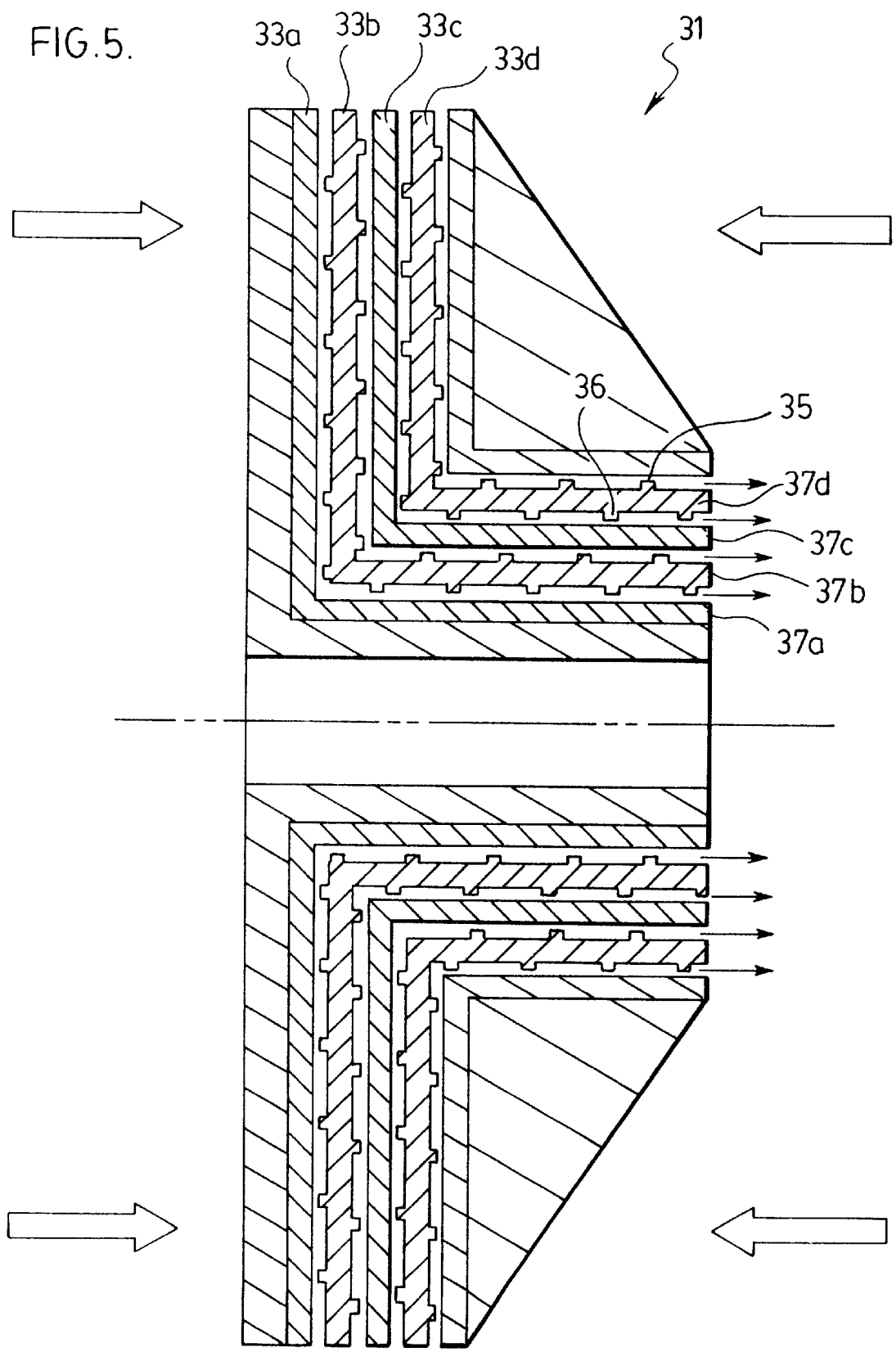

ROTATING DISK EXTRUDER

FIELD OF THE INVENTION

The present invention relates to an extruder used in a plastic extrusion process.

BACKGROUND OF THE INVENTION

A conventional extruder used in a plastic extrusion process is one which comprises an elongated auger which operates in stages lengthwise of the extruder. These stages comprise an initial feeding of the plastic at the upstream end of the extruder, then a transition of the plastic from a solid to a more flowing state, and finally a metering of the plastic at the downstream end of the extruder. This type of extruder, while being very efficient in operation, takes up substantial floor space as a result of its extended length required in performing all of the above operation stages.

Another type of extruder taking up very little floor space, but which has been used to a very limited extent, is one which comprises a rotating disk. This type of extruder has not been overly successful due to excessive pressure build up on the disk which occurs as a result of all three of the above operation stages, i.e. feed, transition and metering occurring across the diameter of the disc.

SUMMARY OF THE PRESENT INVENTION

The present invention provides an extruder which is used in a plastic extrusion process having the small space requirement benefits of the above mentioned disk type extruder but without suffering from the pressure related problems of known disk type extruders. More specifically, the extruder of the present invention, which is supplied with plastic material to make product from the plastic material comprises a plurality of extruder members each of which comprises a plate portion and a hollow tubular portion which is perpendicular or at least substantially perpendicular to the plate portion. The plate portions of the extruder members are located side by side with one another defining a first plastic handling part of the extruder and the tubular portions of the extruder members are telescopically interfitted with one another to define a second plastic handling part of the extruder.

In accordance with the present invention, feed and transition of plastic material introduced to the extruder is carried out in the first plastic handling part of the extruder and the metering of the plastic flow from the extruder is carried out in the second plastic handling part of the extruder. This separation of the metering from feeding stage of operation of the extruder eliminates the pressure related problems of known disk type extruders. At the same time, the extruder of the present invention does not require the large amount of floor space used by lengthy auger type extruders.

BRIEF DESCRIPTION OF THE DRAWINGS

The above as well as other advantages and features of the present invention will be described in greater detail according to the preferred embodiments of the present invention in which;

FIG. 5 is a cross section of a slightly modified extruder according to a further preferred embodiment of the present invention.

Figure 1:
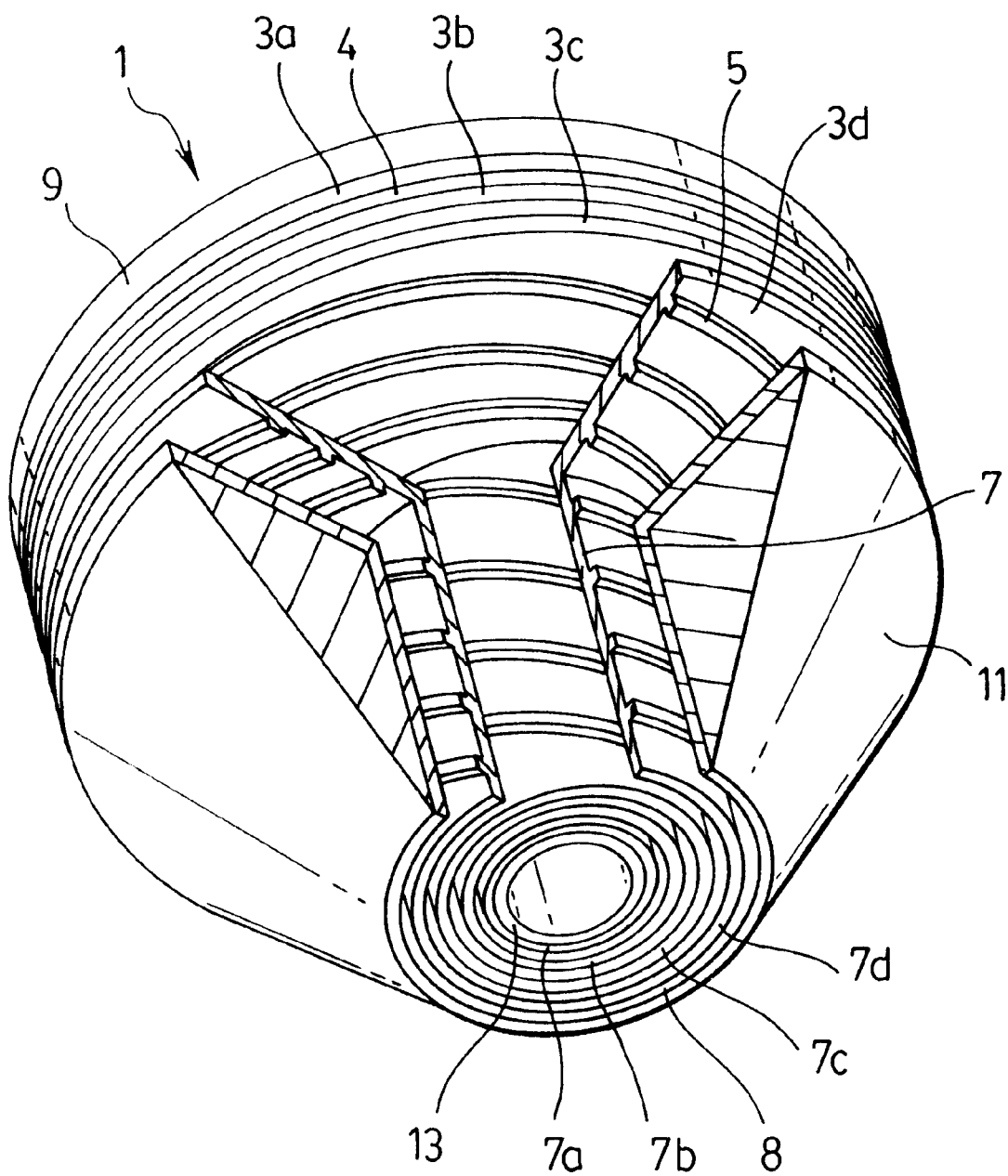
FIG. 1 is a perspective view looking down on a partially sectioned extruder according to a preferred embodiment of the present invention.
Figure 4:
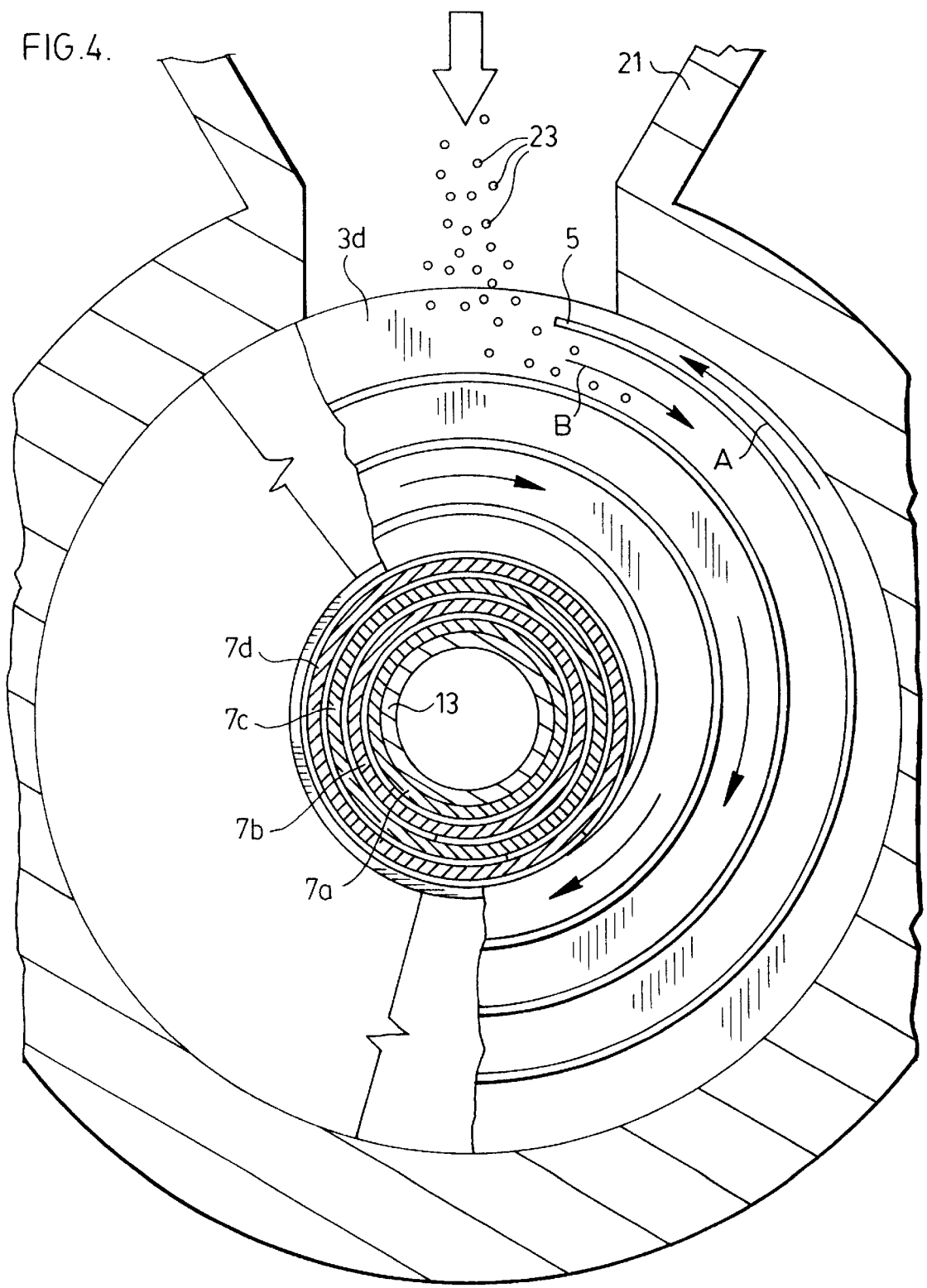
FIG. 4 is a front view of the extruder of FIG. 1 with part of the front support of the extruder removed to show operation of the extruder.

DETAILED DESCRIPTION ACCORDING TO THE PREFERRED EMBODIMENTS OF THE PRESENT INVENTION IN WHICH:

FIG. 1 shows an extruder generally indicated at 1 which is used in an extrusion process to make plastic product. This extruder, as shown in FIG. 4 of the drawings, is supplied with solid particles 23 of plastic material by means of a hopper 21 directing the material downwardly onto the extruder. As will be described below in detail, this material is broken down from its solid state to a flowing state and then output from the extruder to a molding region (not shown) where the product is given its shape.

Figure 2:
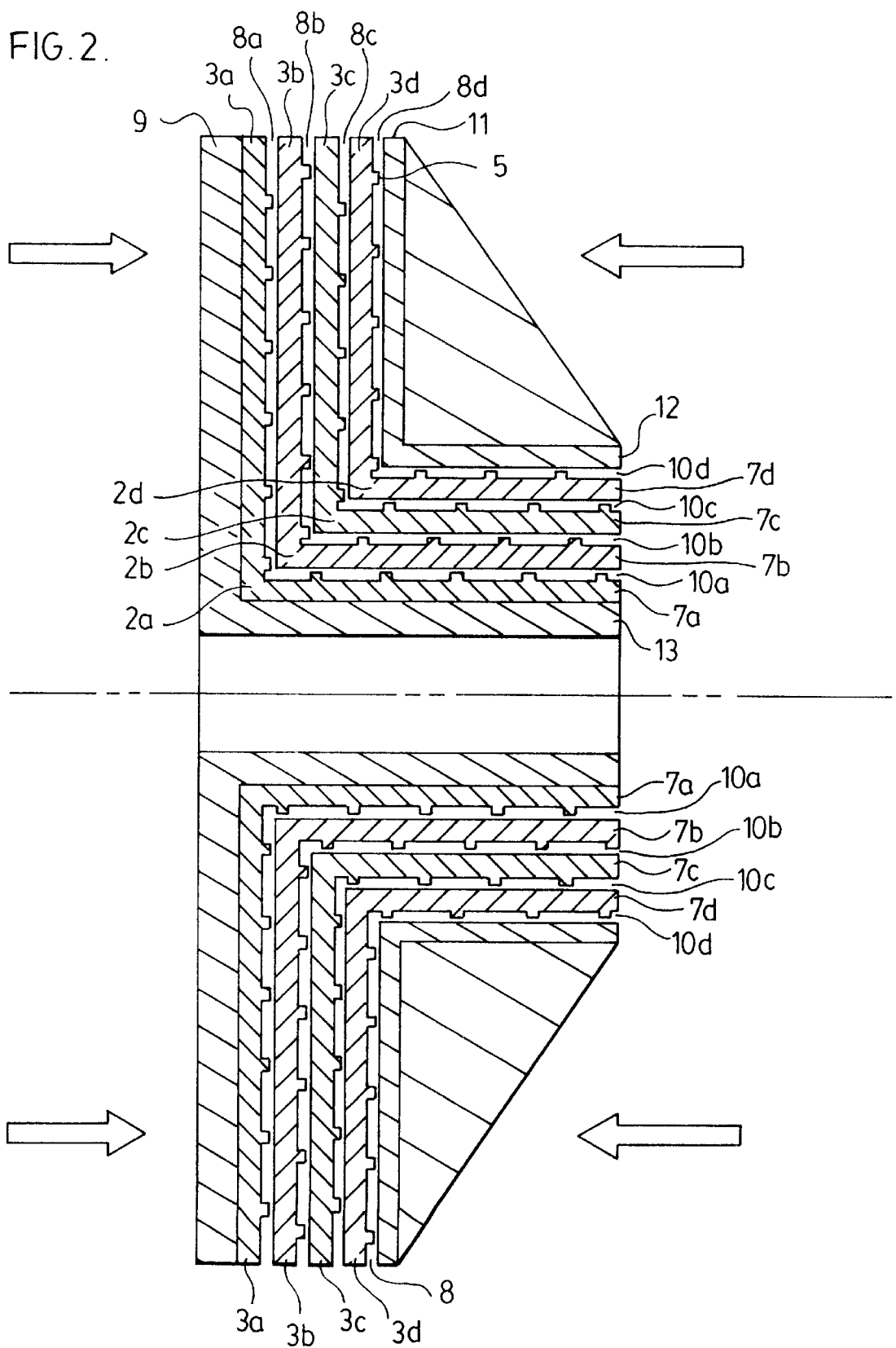
FIG. 2 is a sectional view through the extruder of FIG. 1.
Figure 3:
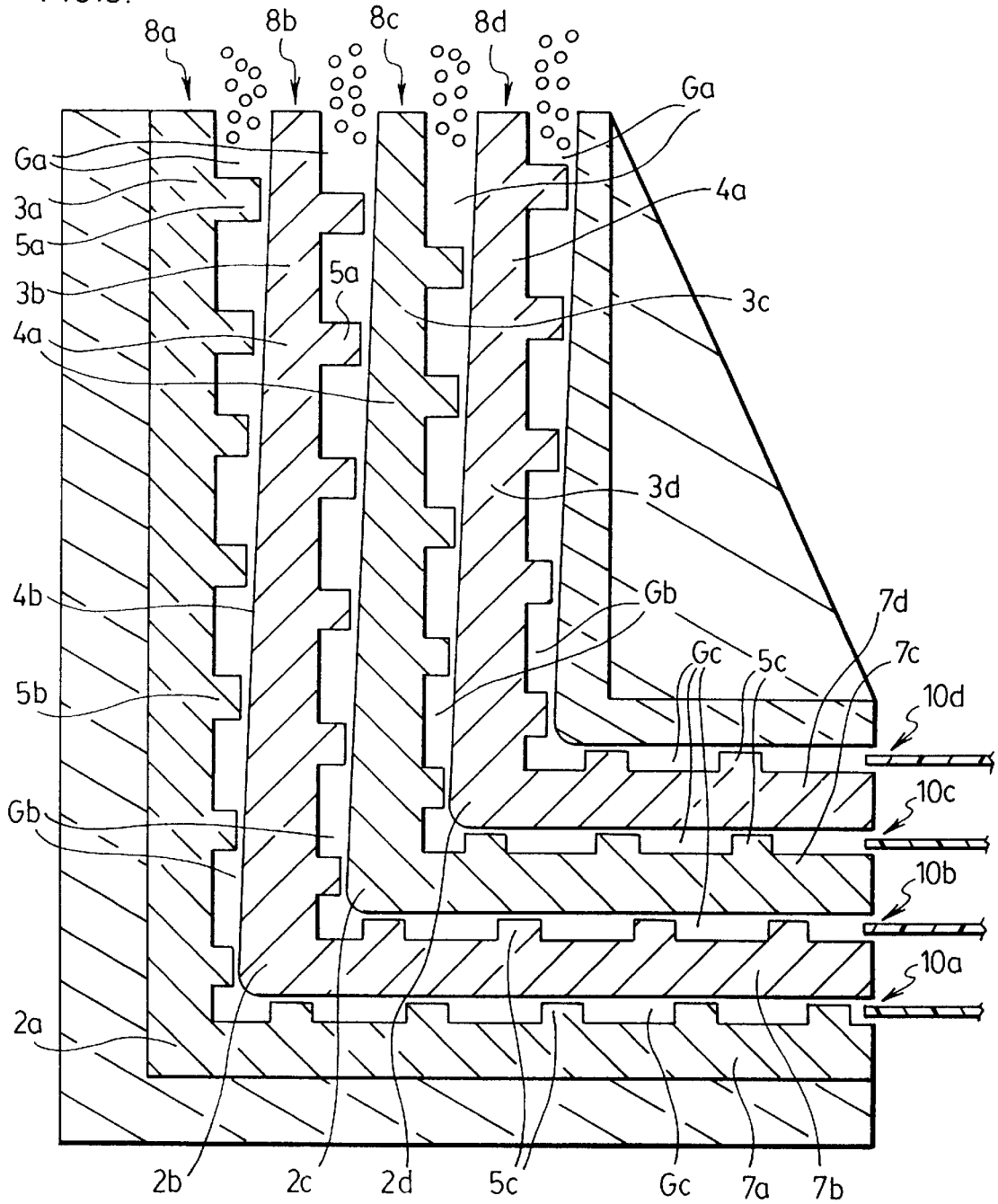
FIG. 3 is a further enlarged sectional view through the upper half of the extruder of FIG. 1.

Referring more particularly to FIGS. 1 and 2 of the drawings, extruder 1 is formed by a plurality of extruder members 2a through 2d each of which comprises a plate portion and a hollow tubular portion perpendicular to, or at least substantially perpendicular to, the plate portion of the extruder member. For example, in FIG. 2 it will be seen that extruder member 2a located to the rear of the extruder comprises plate portion 3a and hollow tubular portion 7a, extruder member 2b comprises plate portion 3b and hollow tubular portion 7b, extruder member 2c comprises plate portion 3c and hollow tubular portion 7c and extruder member 2d located to the front of the extruder comprises plate portion 3d and hollow tubular portion 7d. Plastic inlets 8a through 8d are provided between the extruder members. Also located between the extruder members are feed guides 5 which, as best seen in FIG. 3 of the drawings, comprise a helical rib between each the extruder members.

The extruder operates in a manner such that there is relative rotation between adjacent extruder members. For example, in the FIG. 2 set up, the rear extruder member 2a is fixed in position, the next extruder member 2b is rotatable, the next extruder member 2c is fixed and the forward extruder member 2d is rotatable. The extruder members are all held together by means of the extruder frame comprising a rear and a front frame portion, both of which have a shape similar to that of the extruder members. More specifically, the rear frame portion comprises a back plate 9 and an interior tubular portion 13. The front frame portion comprises a front frame part 11 and a hollow tubular frame portion 12.

The rear extruder member 2a is held against rotation by frame parts 9 and 13 respectively while the most forwardly extruder member 2d rotates relative to frame parts 11 and 12 respectively.

As can be clearly seen in FIG. 2, the plate portions 3a through 3d fit side by side with one another to define a first plastic handling part of the extruder. The extruder portions 7a through 7d telescopically interfit with one another to define a second plastic handling part of the extruder. The purpose of these distinct plastic handling parts is described below.

Referring now to FIG. 4, it will be seen that the plastic particles 23 are dropped from the hopper 21 down onto the extruder. These plastic particles enter the extruder through inlets 8a through 8d between the plate portions 3a through 3d of the extruder members. The moving plates rotate in the direction of arrow A and the plastic particles are carried into the extruder in the direction of arrow B in a feeding stage which is the first stage of operation of the extruder. The extruder is set up for this feeding stage in a number of different ways as best seen in FIG. 3.

Firstly, plate portions 3a through 3d are formed into plate parts 4a and 4b. The plate parts 4a occupying the outer reaches of the extruder members are thinner in profile than plate parts 4b towards the center of the extruder. In addition, the thread is formed into thread parts 5a and 5b in the first handling part of the extruder. Thread parts 5a, which are taller than thread parts 5b, are located in the same part of the extruder as the thinner plate parts 4a leaving relatively wide gaps Ga between the extruder members. The solid plastic particles are easily carried through these wide gaps by the tall thread parts towards the next stage of the extruder operation which occurs in the plastic transition region nearer the center of the extruder.

The transition region, i.e. the region where the plastic particles are converted to a more homogenous flowing condition is found where the shorter thread parts 5b face the wider plate parts 4b. In this region of the extruder the plastic is moved through the smaller gaps Gb where the extruder members are closer to one another to apply increased pressure on the plastic particles. This pressure accompanied by heating of the extruder members produces the change of state of the plastic.

The final stage of extruder operation is the metering stage which determines the flow rate of plastic from the extruder. This metering of plastic occurs between the tubular portions of the extruder members. There may also be some final transition of the plastic material occurring in this second part of the extruder.

In the metering region of the extruder the thread includes short thread parts 5c and the tubular portions are relatively close to one another leaving gaps Gc between the extruder members. These gaps are even narrower than gaps Gb. Furthermore, thread parts 5c are specifically contoured to produce a metering of the plastic so that controlled amounts of the plastic leave the extruder as plastic outputs 10a through 10d.

The plastic outputs from the extruder may be the same or they may be different from one another. In the case of the extruder shown in the drawings outputs 10a through 10d do differ from one another. They are of varying thicknesses. They may also be variable in colour and even in material in which case the hopper is designed to provide individual feeds to each of the plastic inlets 8a through 8d.

The plastic outputs can be put to many different uses. They can be used separately from one another or they can be combined and put to a common use.

One of the key features of the present invention is that the metering of the plastic is carried out in a part of the extruder separate from the part of the extruder where the infeed of the plastic is carried out. This eliminates the problems of having to have separate operating pressures, required for the two different stages, in a single part of the extruder. This is a problem found in known disk extruders. Furthermore, in the first handling part of the extruder the pressures between the plate portions offset one another making it easy to stabilize each individual plate portion. More specifically, plate portion 3a is held in position by frame part 9 while each of the other plate portions experiences offsetting pressures on its front and back surfaces placing these plate portions in equilibrium or at least substantially in equilibrium with one another.

In the second part of the extruder where the metering pressure is required, each of the tubular portions is of a fixed diameter and therefore holds its own positioning relative to all of the other tubular portions.

All of the above features in both parts of the extruder make it very easy to stabilize the entire extruder for its different stages of operation In the embodiment shown in FIG. 2, the helical threads 5 are provided to the front faces of the alternating fixed and rotatable extruder members of extruder 1. There are however other set ups for the helical threads as evidenced for example by extruder 31 shown in FIG. 5 of the drawings. This extruder comprises extruder members formed by plate portions 33a through 33d and hollow tubular portions 37a through 37d. In this embodiment, the helical threads are provided to opposite sides of plate portions 33b and 33d while plate portions 33a and 33c are free of threads. Likewise, the threads are provided to opposite sides of hollow tubular portions 37b and 37d while hollow tubular portions 37a and 37c are free of threads. Furthermore, the threads can either be provided on either a fixed or a rotating extruder member and the different stages of operation will still occur as long as there is relative rotation between adjacent extruder members. This relative rotation can be achieved by having one fixed and one rotating extruder member as described above or it can be further enhanced by having side by side extruder members which rotate in opposite directions.

Although various preferred embodiments of the present invention have been described in detail, it will be appreciated by those skilled in the art that variations may be made without departing from the spirit of the invention or the scope of the appended claims.

The embodiments of the invention in which an exclusive property or privilege is claimed are defined as follows:

1. An extruder to which plastic material is supplied to make product from the plastic material, said extruder comprising a plurality of extruder members which are operated in a manner to produce rotary interaction of adjacent ones of said extruder members, said extruder members having a spacing and a feed guide therebetween to move the plastic material through the extruder, each extruder member comprising a plate portion and a hollow tubular portion which is at least substantially perpendicular to the plate portion, the plate portions of the extruder members being located side by side with one another and defining a first plastic handling part of said extruder and the tubular portions of said extruder members being telescopically interfitted with one another and defining a second plastic handling part of said extruder, said feed guide comprising a helical thread with a first thread part in the first plastic handling part of the extruder and a second thread part in the second plastic handling part of the extruder, the spacing between said extruder members being greater at said first thread part than at said second thread part of said helical thread.

2. An extruder as claimed in claim 1, wherein said extruder receives the plastic material in a solid particle form and wherein said first plastic handling part of said extruder comprises a plastic feed and transition region and wherein said second plastic handling part comprises a plastic metering region for metering flow of plastic output from said extruder, said first thread part being taller in said plastic feed region than said second thread part in said plastic metering region of said extruder.

3. An extruder as claimed in claim 1 wherein said first thread part is taller than said second thread part.

4. An extruder as claimed in claim 3 wherein said extruder members vary in thickness between said first and second plastic handling parts of said extruder, each extruder member being thinner in said first plastic handling part of said extruder at said first said part of said helical thread than in said second plastic handling part of said extruder at said second thread part of said helical thread.

5. An extruder to which plastic material is supplied to make product from the plastic material, said extruder comprising a plurality of extruder members which are operated in a manner to produce rotary interaction of adjacent ones of said extruder members, said extruder members having a spacing and a feed guide therebetween to move the plastic material through the extruder, each extruder member comprising a plate portion and a hollow tubular portion which is at least substantially perpendicular to the plate portion, the plate portions of the extruder members being located side by side with one another and defining a first plastic handling part of said extruder and the tubular portions of said extruder members being telescopically intermitted with one another and defining a second plastic handling part of said extruder, said first plastic handling part of said extruder comprising a plastic feed region and a transition region and said second plastic handling part of said extruder comprising a plastic metering region for metering flow of plastic output from said extruder, said feed guide comprising a helical thread with a first thread part in said plastic feed region, a second thread part in said transition region and a third thread part in said plastic metering region, the first thread part being taller than the second thread part which is in turn taller than the third thread part of said helical thread and the spacing between the extruder members decreasing from the plastic feed region to the transition region and further decreasing from the transition region to the plastic metering region of said extruder.

* * * * *